(12) United States Patent
Zeng et al.

(10) Patent No.: US 8,437,388 B2
(45) Date of Patent: May 7, 2013

(54) DATA LATCH CIRCUIT AND METHOD OF A LOW POWER DECISION FEEDBACK EQUALIZATION (DFE) SYSTEM

(75) Inventors: Yi Zeng, Fremont, CA (US); Freeman Zhong, San Ramon, CA (US); Peter Windler, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 166 days.

(21) Appl. No.: 12/949,838

(22) Filed: Nov. 19, 2010

(65) Prior Publication Data

US 2011/0286511 A1 Nov. 24, 2011

Related U.S. Application Data

(62) Division of application No. 11/709,568, filed on Feb. 21, 2007, now Pat. No. 7,869,498.

(51) Int. Cl.
*H03H 7/40* (2006.01)

(52) U.S. Cl.
USPC .............................. 375/233; 375/232; 326/46

(58) Field of Classification Search .......... 375/229–236, 375/346
See application file for complete search history.

(56) References Cited

U.S. PATENT DOCUMENTS

| | | | |
|---|---|---|---|
| 7,792,185 B2 * | 9/2010 | Bulzacchelli et al. | 375/233 |
| 2005/0157780 A1 * | 7/2005 | Werner et al. | 375/232 |
| 2006/0291552 A1 * | 12/2006 | Yeung et al. | 375/233 |
| 2010/0202506 A1 * | 8/2010 | Bulzacchelli et al. | 375/233 |
| 2011/0188566 A1 * | 8/2011 | Beukema et al. | 375/233 |

* cited by examiner

*Primary Examiner* — Jany Tran
(74) *Attorney, Agent, or Firm* — Raj Abhyanker, P.C.

(57) ABSTRACT

Data latch circuit and method of low power decision feedback equalization (DFE) system is disclosed. In one embodiment, the data latch circuit of the of a decision feedback equalization (DFE) system includes a first parallel n-channel metal-oxide-semiconductor field-effect transistor (NMOS) pair to input a differential input voltage. The data latch circuit also includes a second parallel NMOS pair coupled to the first parallel NMOS pair to input a decision feedback equalization (DFE) voltage. The data latch circuit further includes a cross-coupled PMOS pair to generate a positive feedback to the first parallel NMOS pair and/or the second parallel NMOS pair. In addition, the data latch circuit includes a cross-coupled NMOS pair to escalate the positive feedback. Furthermore the data latch circuit includes a latching circuit to generate a signal data based on the sinking of a current at an input of the latching circuit and/or the positive feedback.

26 Claims, 7 Drawing Sheets

US 8,437,388 B2

DATA LATCH CIRCUIT AND METHOD OF A LOW POWER DECISION FEEDBACK EQUALIZATION (DFE) SYSTEM

CLAIM OF PRIORITY

This application claims priority from U.S. Utility application Ser. No. 11/709,568 titled "LOW POWER DECISION FEEDBACK EQUALIZATION (DFE) THROUGH APPLYING DFE DATA TO INPUT DATA IN A DATA LATCH" filed on Feb. 21, 2007.

FIELD OF TECHNOLOGY

This disclosure relates generally to the technical fields of hardware, and in one embodiment, to a data latch circuit and method of a low power decision feedback equalization (DFE) system.

BACKGROUND

A decision feedback equalization (e.g., DFE in abbreviation) may remove an intersymbol interference (e.g., ISI in abbreviation), which may result from loss mechanisms in copper traces on printed circuit boards. The loss mechanism may include a skin effect (e.g., a tendency of an alternating electric current (AC) to distribute itself within a conductor so that a density of the AC near a surface of the conductor may be greater than the AC of a core of the conductor), a dielectric loss, reflections from impedance discontinuities.

The DFE may use clean decisions of previously received symbols to remove the ISI in a current symbol. In a process of the DFE, previous data decisions may be fed back, scaled with an adaptive weight, and subtracted from an incoming data (e.g., a received data). A data latch may be driven by a sampling clock and make a data decision based on its input obtained by subtracting a decision feedback voltage from the incoming data. A current decision may be used again to generate another decision feedback voltage for next decision. A generation of the decision feedback voltage may need some settling time (e.g., to convert a digital signal to an analog signal), and/or the summing stage may have its own delay.

For a reliable operation of the DFE, a bandwidth of the data latch and/or the summing stage may need to be high (e.g., a time to complete a process may need to be less than 1 unit interval) to guarantee an overall small settling time, thus consuming a large amount of power. In addition, the time to complete the process may cause a constraint to realize a maximal operation speed which may be allowed for the DFE. Furthermore, an additional silicon area may be needed to construct a circuit (e.g., which may be complex) to generate the decision feedback voltage, convert the decision feedback voltage from digital to analog, and subtract the decision feedback voltage from the incoming data.

SUMMARY

Data latch circuit and method of low power decision feedback equalization (DFE) system is disclosed. In one aspect, a data latch circuit of a decision feedback system includes a parallel p-channel metal-oxide-semiconductor field-effect transistor (PMOS) pair. Each of a source of the parallel PMOS pair is coupled to a chipset voltage. An each of a gate of the parallel PMOS pair is coupled to a second clock. The second clock to pre-charge an each of a drain of the parallel PMOS pair to the chipset voltage during a first stage of clocking of the data latch circuit. The data latch system also includes a first parallel n-channel metal-oxide-semiconductor field-effect transistor (NMOS) pair of a two parallel NMOS pair of the data latch circuit. An each of a source of the first parallel NMOS pair is coupled to a first clock. An each of a drain of the first parallel NMOS pair is coupled to the PMOS pair. An each of a gate of the first parallel NMOS pair is coupled a differential input voltage. The data latch circuit further includes a second parallel n-channel metal-oxide semiconductor field-effect transistor (NMOS) pair of the two parallel NMOS pair of the data latch circuit. An each of a source of the second parallel NMOS pair is coupled to the first clock. An each of a drain of the second parallel NMOS pair is coupled to the PMOS pair and/or the first parallel NMOS pair. An each of a gate of the second NMOS pair is coupled to a differential decision feedback equalization (DFE) voltage through a decision feedback digital to analog converter (DAC) of the DFE system that is external to the data latch circuit.

In addition, the data latch circuit includes a cross-coupled PMOS pair to generate a positive feedback to the first parallel NMOS pair, the second parallel NMOS pair and/or another NMOS pair during a second stage of clocking the data latch circuit. Furthermore, the data latch circuit includes a cross-coupled NMOS pair to escalate the positive feedback during a third stage of the clocking of the data latch. An each of a source of the cross-coupled NMOS pair is coupled to the third clock. Moreover, the data latch circuit also includes a latching circuit to generate a signal data based on the positive feedback. The latching circuit is an S-R latch. An input of the latching circuit is coupled to the PMOS pair, the first parallel NMOS pair, the second parallel NMOS pair, the cross coupled PMOS pair and/or the cross coupled NMOS pair.

In another aspect, a method of the data latch circuit of a decision feedback equalization (DFE) system includes inputting a differential input voltage through a first parallel n-channel metal-oxide-semiconductor field-effect transistor (NMOS) pair of the data latch circuit. The method of the data latch circuit also includes inputting a decision feedback equalization (DFE) voltage through a second parallel NMOS pair of the data latch circuit. The method further includes reducing an average power consumption of the DFE system through performing a summing and/or subtracting of the DFE voltage with the differential input voltage in the data latch circuit. In addition, the method of the data latch circuit includes sampling in the data latch circuit a voltage resulting from summing the DFE voltage with the differential input voltage. Furthermore, the method of the data latch circuit includes generating through a latching circuit of the data latch circuit a signal data based on a positive feedback from a cross coupled NMOS pair and/or a cross coupled PMOS pair. The signal data is an output of the data latch circuit. The first parallel NMOS pair, the second parallel NMOS pair, the cross-coupled NMOS pair, the cross-coupled PMOS pair and/or the latching circuit is coupled to each other.

In yet another aspect, a data latch circuit of a decision feedback equalization (DFE) system may include a first parallel n-channel metal-oxide-semiconductor field-effect transistor (NMOS) pair to input a differential input voltage. An each of a source of the first parallel NMOS pair is coupled to a first clock. The data latch circuit also includes a second parallel NMOS pair coupled to the first parallel NMOS pair to input a decision feedback equalization (DFE) voltage. An each of a source of the first second NMOS pair is coupled to the first clock. The data latch circuit further includes a cross-coupled PMOS pair to generate a positive feedback to the first parallel NMOS pair, the second parallel NMOS pair and/or another NMOS pair during a second stage of clocking the data latch circuit. In addition, the data latch circuit includes a cross-coupled NMOS pair to escalate the positive feedback during a third stage of the clocking of the data latch. An each of a source of the cross coupled NMOS pair is coupled to a third clock. Furthermore, the data latch circuit includes a threshold decision feedback digital to analog converters (DACs) to generate a negative threshold voltage, a common mode threshold voltage and/or a positive threshold voltage. Also the data latch circuit includes a latching circuit to generate a signal data based on the sinking of a current at an input of the latching circuit in a second stage of clocking of the data latch circuit and/or the positive feedback. The latching circuit is an S-R latch. An input of the latching circuit is coupled to the first parallel NMOS pair, the second parallel NMOS pair, the cross-coupled PMOS pair and/or the cross-coupled NMOS pair.

In yet another aspect, the data latch circuit of the of a decision feedback equalization (DFE) system includes a first parallel n-channel metal-oxide-semiconductor field-effect transistor (NMOS) pair to input a differential input voltage. An each of a source of the first parallel NMOS pair is coupled to a first clock. The data latch circuit also includes a second parallel NMOS pair coupled to the first parallel NMOS pair to input a decision feedback equalization (DFE) voltage. An each of a source of the first second NMOS pair coupled to the first clock. The data latch circuit further includes a cross-coupled PMOS pair to generate a positive feedback to the first parallel NMOS pair, the second parallel NMOS pair and/or another NMOS pair during a second stage of clocking the data latch circuit. In addition, the data latch circuit includes a cross-coupled NMOS pair to escalate the positive feedback during a third stage of the clocking of the data latch. An each of a source of the cross coupled NMOS pair coupled to a third clock. Furthermore the data latch circuit includes a latching circuit to generate a signal data based on the sinking of a current at an input of the latching circuit in a second stage of clocking of the data latch circuit and/or the positive feedback. The latching circuit is an S-R latch. An input of the latching circuit is coupled to the first parallel NMOS pair, the second parallel NMOS pair, the cross-coupled PMOS pair and/or the cross-coupled NMOS pair.

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
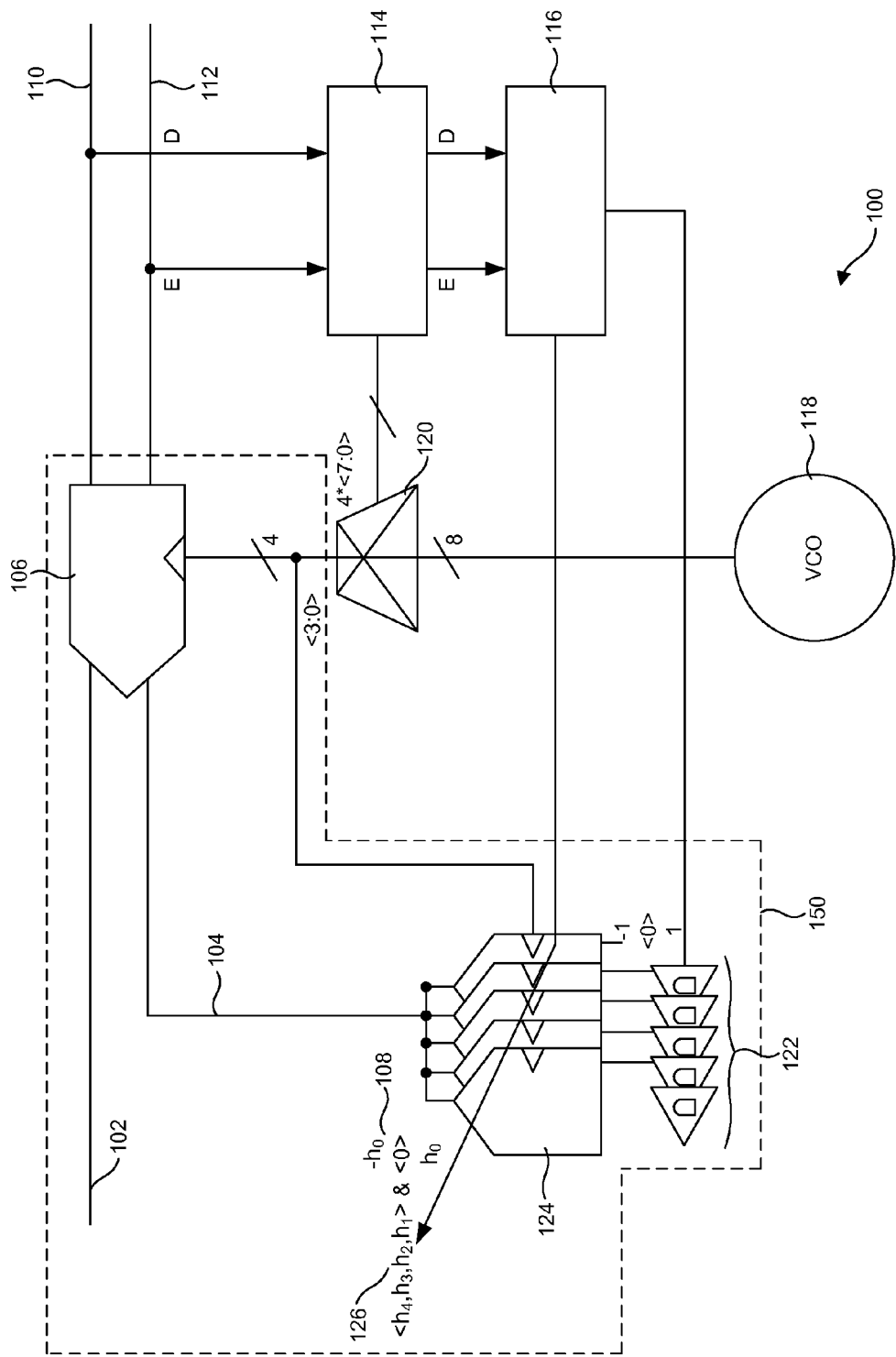
FIG. 1 is a system view of decision feedback equalization (DFE), according to one embodiment.

Other features of the present embodiments will be apparent from the accompanying drawings and from the detailed description that follows.

DETAILED DESCRIPTION

Data latch circuit and method of low power decision feedback equalization (DFE) system is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a decision feedback equalization (DFE) system to remove a post cursor intersymbol interference (ISI) through feeding back previous data scaled with adaptive weights to the DFE system, with each slice of the DFE system includes a first set of decision feedback digital to analog converters (DACs) to generate a first DFE data obtained through the feeding back the previous data scaled with the adaptive weights and a first data latch to generate an output data of the each slice through applying the first DFE data to an input data of the each slice in the first data latch to remove a first delay caused by performing the applying the first DFE data to the input data of the each slice outside of the first data latch.

In another embodiment, a data latch circuit of a decision feedback equalization (DFE) system includes a parallel p-channel metal-oxide-semiconductor field-effect transistor (PMOS) pair with sources of the parallel PMOS pair coupled to a chipset voltage and gates of the parallel PMOS pair coupled to a second clock to pre-charge drains of the parallel PMOS pair to the chipset voltage during a first stage of clocking of the data latch circuit, two parallel n-channel metal-oxide-semiconductor field-effect transistor (NMOS) pairs with sources of the two parallel NMOS pairs coupled to a drain of a first clock, drains of the two parallel NMOS pairs coupled to the drains of a PMOS pair, and gates of the two parallel NMOS pairs coupled to a differential input voltage and/or a differential DFE data to sink a current during a second stage of the clocking of the data latch, a cross-coupled PMOS pair to generate a positive feedback to the two parallel NMOS pair and the another NMOS pair during the second stage and a cross-coupled NMOS pair to escalate the positive feedback during a third stage of the clocking of the data latch and a S-R latch to generate a signal data based on the positive feedback, wherein the first clock, the second clock, and a third clock may be low during the first stage, the first clock and the second clock are high but the third clock is low during the second stage, and the first clock is low but the second clock and the third clock are high during the third stage.

In yet another embodiment, a method of decision feedback equalization (DFE) system includes applying DFE data to differential input data during a clocking of a data latch through directly coupling decision feedback digital to analog converters generating the DFE data to the data latch to remove a delay due to having the applying the DFE data to the differential input data outside of the data latch and generating an output data obtained through the applying the decision feedback equalization data to the differential input data to remove an intersymbol interference associated with the differential input data.

FIG. 1 is a system view of decision feedback equalization (DFE) 100, according to one embodiment. Particularly, FIG. 1 illustrates an input data 102, a decision feedback equalization (DFE) data 104, a data latch 106, a threshold data 108, an output data 110, an error data 112, a clock and data recovery circuit 114, an adaptor circuit 116, an oscillator 118, a phase interpolator 120, a previous data 122, a decision feedback DAC 124, ISI injects 126, according to one embodiment. The input data 102 may be an analog input consisting of two terminals that may be isolated from computer ground, whose difference may be measured. The decision feedback equalization data 104 may be fed to the data latch 106 to remove a post cursor intersymbol interference (ISI) of the input data 102.

The data latch 106 may be a data storage circuitry used to store information in sequential logic systems. The threshold data 108 may be a fixed value data associated with the error data 112. The threshold data 108 may be a positive value (e.g., +h) and/or a negative value (−h). The output data 110 may be data obtained from the data latch 106. The error data 112 may also be obtained from the data latch 106. The clock and data recovery circuit 114 may generate an optimum location to sample an input data based on the output data 110 and the error data 112.

The Adaptor circuit 116 may adjust the ISI injects based on the output data 110 and the error data 112. The oscillator 118 may be an electronic device used to generate an oscillating signal that may be based on a periodic event that may repeat at a constant rate. The phase interpolator 120 may be used to adjust a timing of a clock associated with the oscillator 118 based on a voltage. The decision feedback DAC 124 may be used to generate the DFE data 104 obtained through feeding the previous data scaled with the adaptive weights (e.g., and/or the threshold data 108). The ISI injects 126 may be adaptive weights applied to the previous data 122 adjusted by the adaptor circuit 116.

In example embodiment illustrated in FIG. 1, the input data 102 and the decision feedback equalization DFE data 104 (e.g., obtained through the feeding back the previous data 122 scaled with the ISI injects 126) may be fed to the data latch 106 to obtain the output data 110 and/or the error data 112.

In another example embodiment, a decision feedback equalization (DFE) system may remove the post cursor intersymbol interference (ISI) through feeding back previous data (e.g., the previous data 122) scaled with adaptive weights to the DFE system. A clock and data recovery circuit (e.g., a clock and data recovery circuit 114 of FIG. 1) of the DFE system (e.g., the DFE system 100) may generate an optimum location to sample the input data based on an output data (e.g., the output data 110) and an error data (e.g., the error data 112). An adaptor circuit (e.g., the adaptor circuit 116 of FIG. 1) of the DFE system may adjust the adaptive weights (e.g., adaptive weights are amounts of ISI injects of the previous data to the input data) based on the output data and the error data. A phase interpolator of the DFE system may adjust a timing (e.g., a timing obtained through the clock and data recovery circuit 114 controls sampling of the input data 102) of a clock based on a voltage controlled oscillator (VCO) (e.g., the oscillator 118 of FIG. 1).

Figure 2:
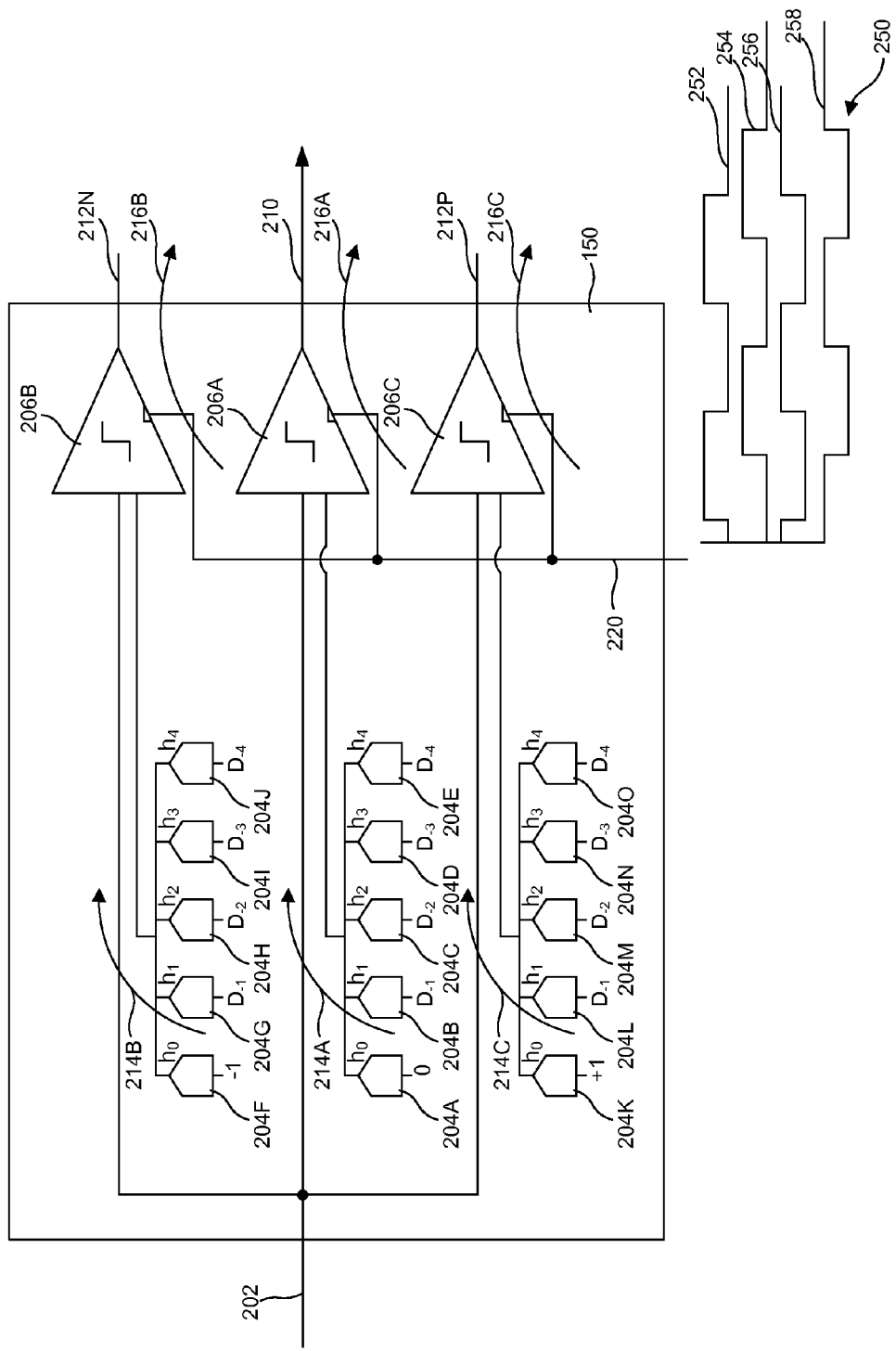
FIG. 2 is an exploded view of a decision feedback DACs and the data latch of FIG. 1, according to one embodiment.

FIG. 2 is an exploded view of the decision feedback DACs 124 and the data latch 106 of FIG. 1, according to one embodiment. Particularly, FIG. 2 illustrates a differential input data 202 (e.g., the input data 102), a first set of decision feedback DACs 204A-E, a second set of decision feedback DACs 204F-J, a third set of decision feedback DACs 204K-O, data latches 206A-C, an output data 210, a positive error data 212P, a negative error data 212N, a settling time 214A-C, a latch clock delay 216A-C, a clock 220, a clock phase diagram 250, a clock phase 0 252, a clock phase 1 254, a clock phase 3 256, a clock phase 4 258, according to one embodiment.

The differential input data ($V_{IN}$, $V_{IP}$) 202 may be fed to an input terminal of the data latch 206A, data latch 206B and/or data latch 206C. The first decision feedback DAC 204A-E may generate the first DFE data through applying the adaptive weights to the previous data. The second decision feedback DAC 204F-J may generate the second DFE data through applying with the adaptive weights and/or a negative threshold value to the previous data. The third decision feedback DAC 204K-O may generate the third DFE data through applying the adaptive weights and the positive threshold value to the previous data.

The data latch 206 may be a data storage device used to store information in sequential logic systems. The output data 210 may be obtained through subtracting the DFE voltage based on the previous data from the differential input data 202 in the data latch 206A. The negative error data 212N may be obtained through subtracting the DFE voltage based on the previous data and the negative threshold value from the differential input voltage in the data latch 206B. The positive error 212P may be obtained through subtracting the DFE voltage based on the previous data and the positive threshold value from the differential input voltage in the data latch 206C. The settling time 214 may be a length of delay required by the decision feedback DACs 204. The latch clock delay 216 may be a delay required by the data latch 206. The clock 220 may be a voltage controlled oscillator (VCO) having a 1.6 GHz ring oscillator.

The clock phase diagram 250 may represent 4 clock signals of four parallel DFE circuits with each of the four parallel DFE circuits to recover the differential input data 202 in 6.4 Giga-bits per second (Gb/s). The clock phase diagram 250 may represent a timing of the clock 220 in the four parallel DFE circuits, where the phase of the clock 220 may be delayed or preceded by one tap clock rate between any two adjacent circuits of the four parallel DFE circuits.

In one example embodiment illustrated in FIG. 2, a first DFE data (e.g., of the DFE data 104) may be generated through applying the adaptive weights (e.g., the ISI injects 126) to a first set of decision feedback digital to analog converters (DACs) 204A-E. An output data (e.g., the output data 210) of the each slice may be generated by a first data latch (e.g., the data latch 206A) through applying the first DFE data to an input data (e.g., the differential input data 202) of the each slice in the first data latch to remove a first delay caused by performing the applying the first DFE data to the input data of the each slice outside of the first data latch. The input data may be a pseudo-differential input to reject a DC common-mode voltage and/or a fully-differential input to reject the DC common-mode voltage and/or a dynamic common-mode voltage.

Moreover, a second DFE data may be generated through applying the adaptive weights (e.g., the ISI injects 126) and/or a negative threshold value (e.g., $-h_0$) to the previous data (e.g., using a second set of decision feedback DACs). A negative error data (e.g., the negative error data 212N) of the each slice may be generated through applying the second DFE data to the input data of the each slice in the second data latch to remove a second delay caused by performing the applying the second DFE data to the input data outside of the second data latch.

Furthermore, a third DFE data may be generated through applying the adaptive weights and/or a positive threshold value (e.g., +h$_0$) to the previous data. A positive error data (e.g., the positive error data 212P) of the each slice may be generated by a third data latch through applying the third DFE data from the input data of the each slice in the third data latch to remove a third delay caused by performing the applying the third DFE data to the input data outside of the third data latch. An average power consumption of the DFE system may be lowered by 2 to 3 mili-volts per each of the first data latch, the second data latch, and/or the third data latch when compared to a DFE system with additional circuits to perform the applying the first DFE data, the second DFE data, and/or the third DFE data to the input data (e.g., using a summing and/or a subtraction stage outside of the data latches).

Figure 3:
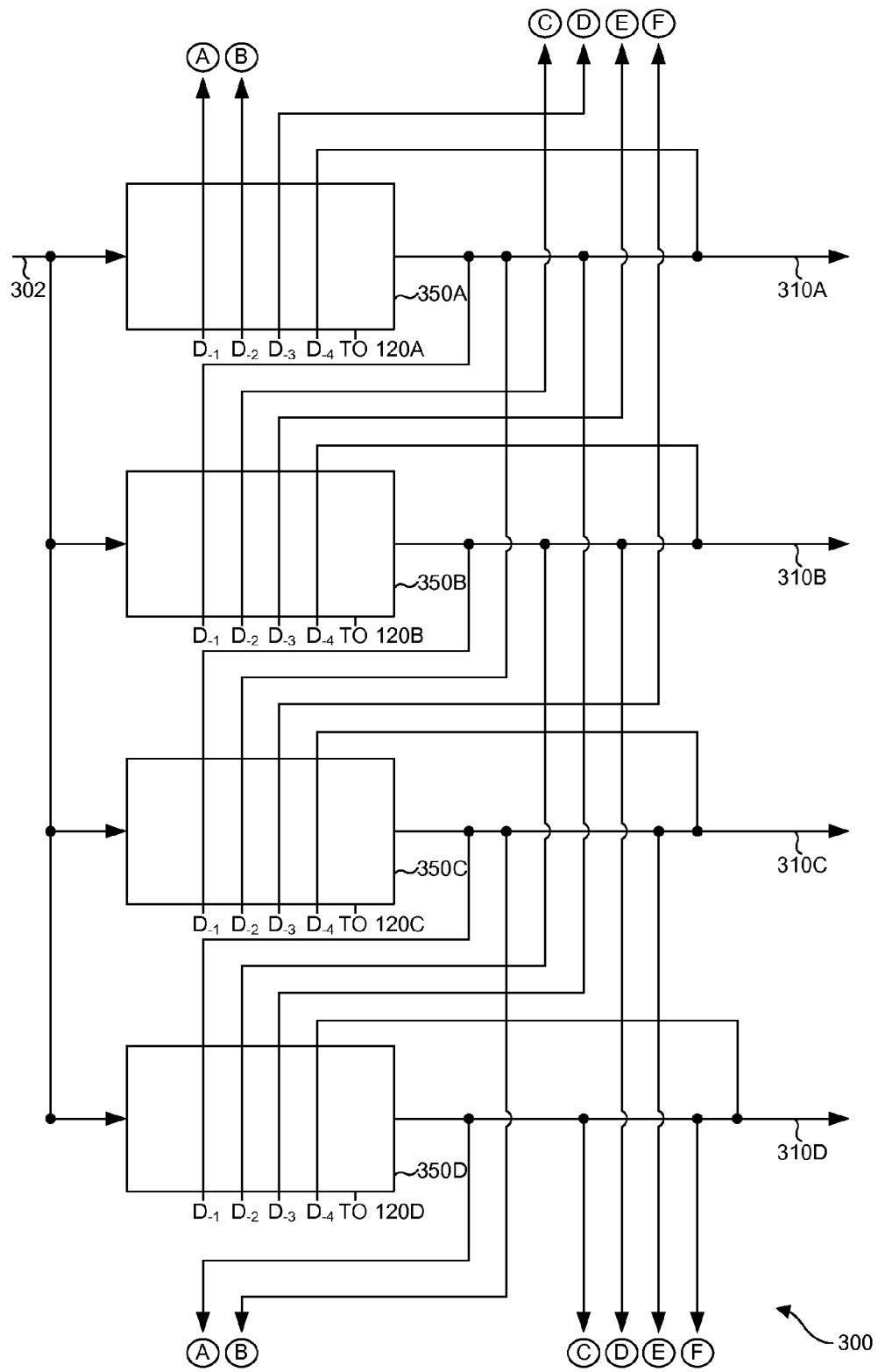
FIG. 3 is a circuit diagram of the DFE system of FIG. 1 having four parallel DFE circuits, according to one embodiment.

FIG. 3 is a circuit diagram of the DFE system of FIG. 1 having four parallel DFE circuits, according to one embodiment. Particularly, FIG. 3 illustrates a differential input data ($V_{IN}$, $V_{IP}$) 302, output data 310A-D, and data latches each having decision feedback DACs 350A-D, according to one embodiment. The differential input data ($V_{IN}$, $V_{IP}$) 302 may be a pseudo-differential input to reject the DC common-mode voltage and/or a fully-differential input to reject the DC common-mode voltage and/or the dynamic common-mode voltage. The output data 310 may be generated from the data latches each having the decision feedback DACs 350A-D. The data latches each having the decision feedback DACs may process the differential input data 302 and previous data (e.g., $D_{-1}$, $D_{-2}$, $D_{-3}$, and/or $D_{-4}$) to generate the output data 310 (e.g., and/or error data).

In one example embodiment illustrated in FIG. 3, a DFE system (e.g., the DFE system 300) may include four parallel DFE circuits (e.g., the four parallel DFE circuits 350A-D) with each of the four parallel DFE circuits that may recover the input data (e.g., the differential input data 302) in 6.4 giga-bits per second (Gb/s) with the VCO of the each slice to have a 1.6 GHz ring oscillator. The timing of the clock may be delayed by one tap clock rate between any two adjacent circuits of the four parallel DFE circuits.

Figure 4:
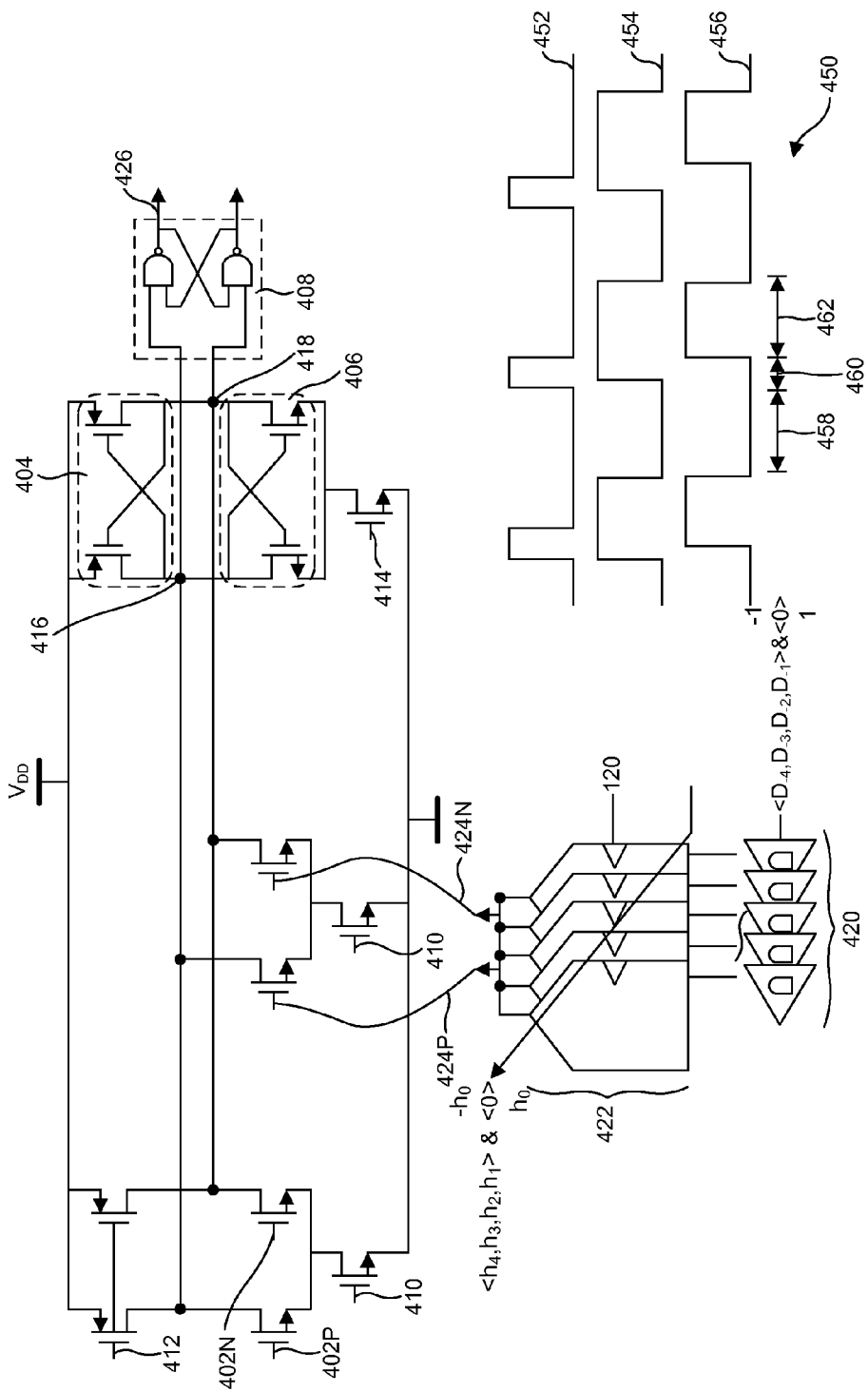
FIG. 4 is a circuit diagram of a data latch circuit having a subtraction (e.g., and/or summing) capacity, according to one embodiment.

FIG. 4 is a circuit diagram of a data latch circuit having a subtraction (e.g., and/or summing) capacity, according to one embodiment. Particularly, FIG. 4 illustrates a differential input voltage (402N, 402P) (e.g., the input data 102, the differential input data 202, and/or the differential input data 302), a cross-coupled PMOS pair 404, a cross-coupled NMOS pair 406, a S-R latch 408, a clock 1 410, a clock 2 412, a clock 3 414, a node A 416, a node B 418, a previous data 420, decision feedback DACs 422, a DFE voltage (424 N, 424 P), a signal data 426, a clock phase diagram 450, a clock signal 1 452, a clock signal 2 454, a clock signal 3 456, a stage 1-3 458-462, according to one embodiment. The differential input voltage 402 may provide input signal to the gates of a two parallel NMOS pairs (e.g., a first parallel NMOS pair).

The cross-coupled PMOS pair 404 may generate a positive feedback to the two parallel NMOS pair (e.g., the first parallel NMOS pair, the second parallel NMOS pair) and/or another NMOS pair during the second stage. The cross-coupled NMOS pair 406 may escalate the positive feedback during a third stage of the clocking of the data latch. The S-R latch 408 may generate the signal data based on the positive feedback.

The clock 1 410, the clock 2 412, and the clock 3 414 may be represented by the clock signal 1, 452, the clock signal 2 454, and the clock signal 3 456, respectively. The node A 416 and the node B 418 may be two inputs to the S-R latch 408.

The previous data 420 may be the signal data 426 generated from the DFE system feeding back to the decision feedback DACs 422. The DFE voltage 424 may be obtained through applying adaptive weights based on the signal data 426 and error data to the previous data 420. The signal data 426 may be obtained through subtracting the DFE voltage 424 from the differential input voltage 402. The clock phase diagram 450 may represent the clock signals (e.g., the clock signal 1 452, the clock signal 2 454, and the clock signal 3 456) of the three clocks (e.g., the clock 1 410, the clock 2 412, and the clock 3 414) in time domain. In the stage 1 458, the clock signal 1, the clock signal 2, and the clock signal 3 are low. In the stage 2 460, the clock signal 1 452 and the clock signal 2 454 are high while the clock signal 3 456 is low. In the stage 3 462, the clock signal 1 452 is low while the clock signal 2 454 and the clock signal 3 456 are high.

In one example embodiment illustrated in FIG. 4, at the stage 1 458, the node A 416 and the node B 418 may be pre-charged to a chipset voltage (e.g., a $V_{DD}$), when the PMOS pair associated with the clock 2 412 (e.g., which is low during the stage 1 458) are turned on. At the stage 2 460, pre-charging of the node A 416 and the node B 418 may be stopped (e.g., when the PMOS pair associated with the clock 2 412 are turned off). In addition, the NMOS pair associated with the differential input voltage 402 (e.g., first parallel NMOS pair) and another NMOS pair associated with the decision feedback DACs 422 (e.g., second parallel NMOS pair) will start sinking current basing on the differential input voltage 402 and the DFE voltage 424, respectively. Furthermore, the cross-coupled PMOS pair 404 may offer a positive feedback to any of the node A 416 and the node B 418. At the stage 3 462, the cross-coupled NMOS pair may intensify (e.g., offer more) the positive feedback, thus causing a differential voltage swing at the node A 416 and the node B 418 to the maximum.

When the differential input voltage 402 is over a minimal input sensitivity (e.g., a threshold value such as 0.3 volt) at a moment of sampling (e.g., the differential input voltage 402), the signal data 426 may be hard limited to the maximum swing. Also, the current sinking at the node A 416 and the current sinking at the node B 418 may at a start of the stage 2 460 may dictate the signal data 426. Accordingly, introducing of two more sinking current sources (e.g., the second NMOS pair associated with the DFE voltage 424) in the data latch and summing (e.g., and/or a subtraction) of the two more sinking current sources to two already existing sinking current sources (e.g., the first parallel NMOS pair associated with the differential input voltage 402) may be equal to first summing the two voltages (e.g., the differential input voltage 402 and the DFE voltage 424) outside of the data latch and sampling a resulting voltage based on the summing using the data latch.

In another example embodiment, the signal data 426 may be an output data obtained through subtracting the DFE voltage 424 from the differential input voltage 402. The signal data may also be a negative error data obtained through subtracting the DFE voltage 424 and a negative threshold voltage from the differential input voltage 402. In addition, the signal data 426 may be a positive error data through subtracting the DFE voltage 424 and a positive threshold voltage from the differential input voltage 402. Moreover, a first current induced by the input data and a second current induced by the DFE voltage may be integrated (e.g., rather than just being added) during the second stage.

Figure 5:
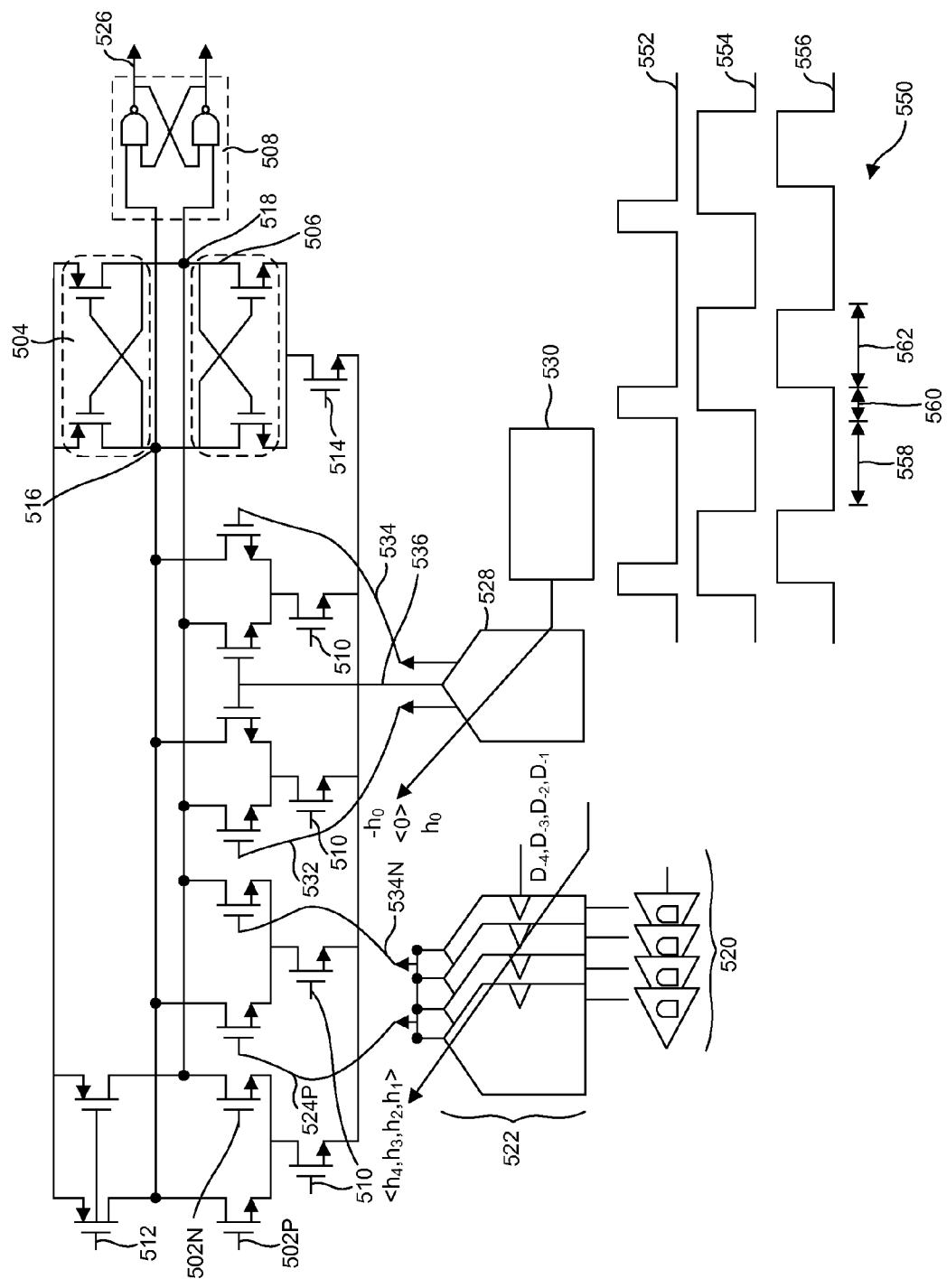
FIG. 5 is a circuit diagram of a data latch circuit having a separate decision feedback DAC to generate a threshold voltage, according to one embodiment.

FIG. 5 is a circuit diagram of a data latch circuit having a separate decision feedback DAC to generate a threshold voltage, according to one embodiment. Particularly, FIG. 5 illustrates a differential input voltage (502N, 502P) (e.g., the input data 102, the differential input data 202, and/or the differential input data 302), a cross-coupled PMOS pair 504, a cross-coupled NMOS pair 506, a S-R latch 508, a clock 1 510, a clock 2 512, a clock 3 514, a node A 516, a node B 518, a previous data 520, decision feedback DACs 522, a DFE voltage (524 N, 524 P), a signal data 526, a threshold decision feedback DAC 528, an adaptor circuit 530, a positive threshold voltage (e.g., +h) 532, a common mode threshold voltage (e.g., 0 volt) 534, and a negative threshold voltage (e.g., –h), a clock phase diagram 550, a clock signal 1 552, a clock signal 2 554, a clock signal 3 556, a stage 1-3 558-562, according to one embodiment.

The threshold decision feedback DAC 528 may generate the threshold decision feedback voltage (e.g., the positive threshold voltage 532, the common mode threshold voltage 534, and the negative threshold voltage 536). The adaptor circuit 530 may adjust the adaptive weights based on the signal data 526 (e.g., the output data 210, the negative error data 212N, and/or the positive error data 212P of FIG. 2), in which the adaptive weights are amounts of ISI injects of the previous data 520 to the differential input voltage 402. The positive threshold voltage 532 and/or the negative threshold voltage 536 may be determined by the adaptor circuit 530 (e.g., where the common mode threshold voltage is 0 volt). The remaining elements may be equivalent to those of FIG. 4.

Figure 6:
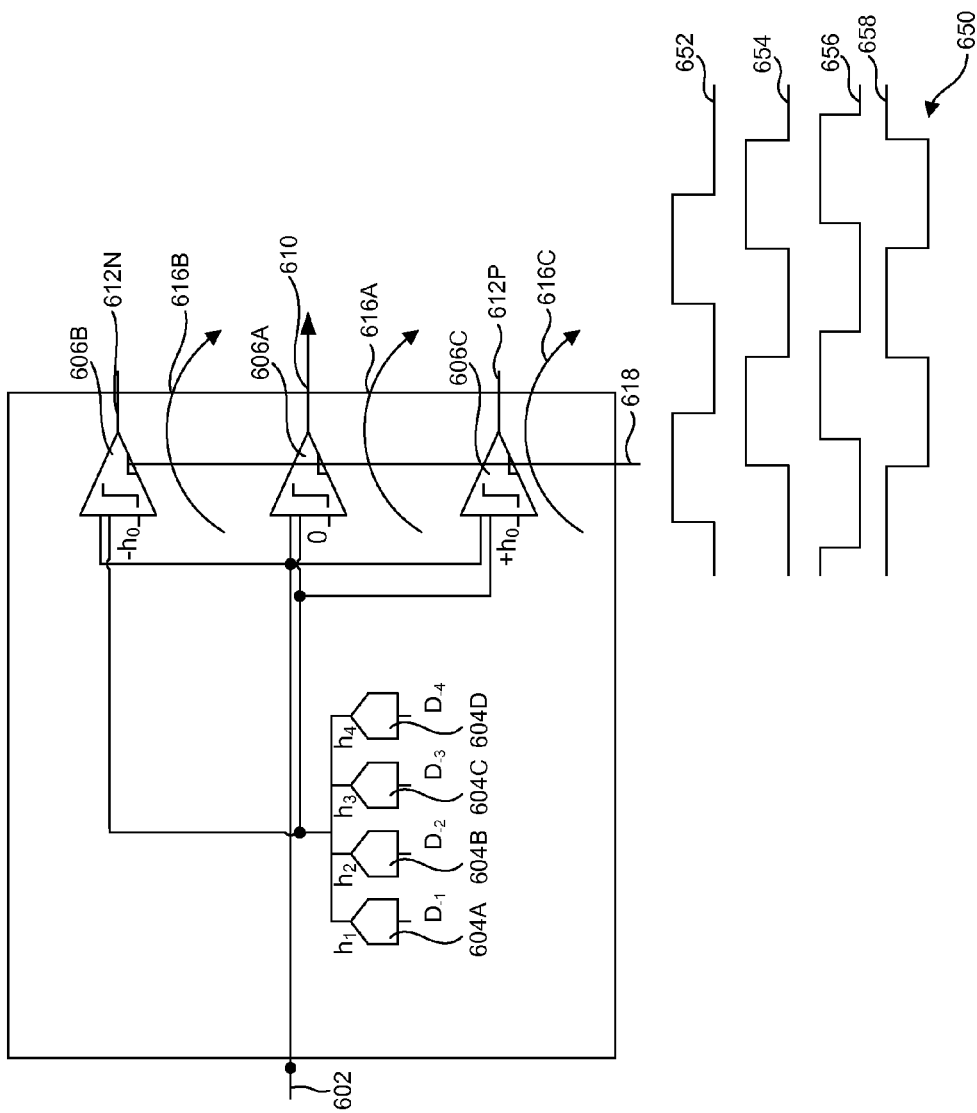
FIG. 6 is a partial diagram of a decision feedback equalization circuit with a reduced number of decision feedback DACs, according to one embodiment.

FIG. 6 is a partial diagram of a decision feedback equalization circuit with a reduced number of decision feedback DACs 604, according to one embodiment. Particularly, FIG. 6 illustrates a differential input data 602, decision feedback DACs 604, data latches 606, an output data 610, a negative error data 612N, a positive error data 612P, and a latch clock delay 616, according to one embodiment.

The differential input data 602 may be a pseudo-differential input to reject the DC common-mode voltage and/or a fully-differential input to reject the DC common-mode voltage and/or the dynamic common-mode voltage. The decision feedback DACs 604 may be a set of decision feedback DACs to generate DFE data fed to the data latch 606. The data latch 606 may be a data storage circuitry used to store information in sequential logic systems. The output data 610, the negative error data 612N, and the positive error data 614P may based on the differential input data 602, the DFE voltage and a threshold data (e.g., +h, 0, –h). The latch clock delay 616 may a delay created by the data latch 606.

In example embodiment illustrated in FIG. 6, the decision feedback DACs 604 generating the DFE data may be shared by the data latch 606A generating the output data 610 and the data latches 606A/606B generating the error data 612 such that a power consumption of the DFE system may be decreased by about 20 percent when compared to another DFE system which does not share its DFE DACs. Also, a die space of the DFE system may be reduced by at least 5% by removing at least 50% of the DFE DACs of the DFE system (e.g., when the DFE DACs are shared by the data latch 606A and the data latches 606B/606C).

Figure 7:
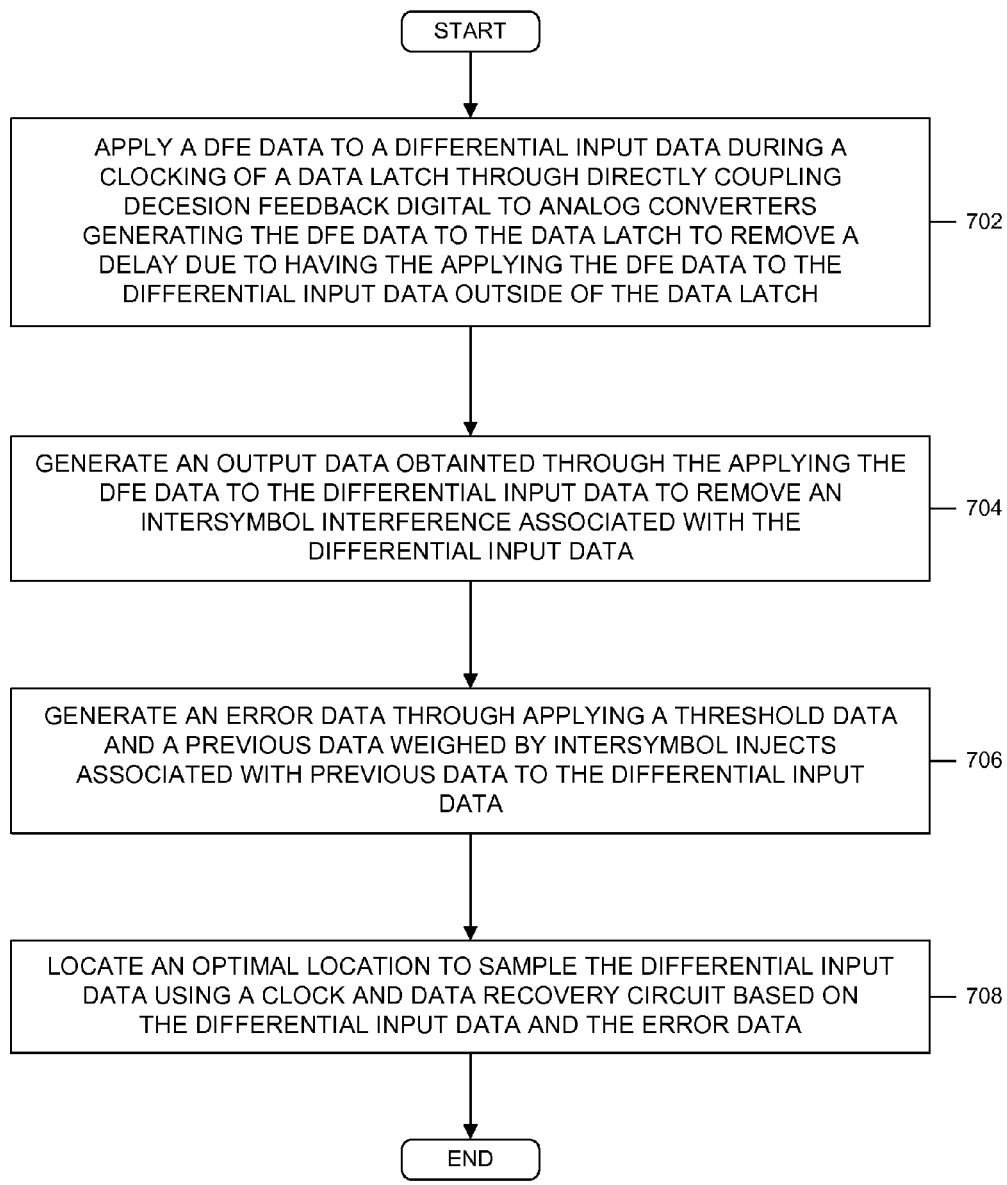
FIG. 7 is a process flow of lowering a power consumption of a decision feedback equalization system through applying a DFE data to a differential input data in a data latch, according to one embodiment.

FIG. 7 is a process flow of lowering a power consumption of a decision feedback equalization system through applying a DFE data to a differential input data in a data latch, according to one embodiment. In operation 702, the DFE data may be applied to the differential input data during a clocking of a data latch through directly coupling decision feedback digital to analog converters generating the DFE data to the data latch to remove a delay due to having the applying a decision feedback equalization data to the differential input data outside of the data latch.

In operation 704, an output data may be generated through the applying the decision feedback equalization data to the differential input data to remove an intersymbol interference associated with the differential input data. In operation 706, an error data may be generated through applying a threshold data and a previous data weighed by ISI injects associated with the previous data to the differential input data. In operation 708, an optimal location to sample the differential input data may be located using a clock and a data recovery circuit based on the differential input data and the error data.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A data latch circuit of a decision feedback equalization (DFE) system, comprising:
 a parallel p-channel metal-oxide-semiconductor field-effect transistor (PMOS) pair, each of a source of the parallel PMOS pair being coupled to a chipset voltage, and each of a gate of the parallel PMOS pair being coupled to a second clock to pre-charge each of a drain of the parallel PMOS pair to the chipset voltage during a first stage of clocking of the data latch circuit;
 a first parallel n-channel metal-oxide-semiconductor field-effect transistor (NMOS) pair of a two parallel NMOS pair, each of a source of the first parallel NMOS pair being coupled to a first clock, each of a drain of the first parallel NMOS pair being coupled to the PMOS pair, and each of a gate of the first parallel NMOS pair being coupled to a differential input voltage;
 a second parallel n-channel metal-oxide semiconductor field-effect transistor (NMOS) pair of the two parallel NMOS pair, each of a source of the second parallel NMOS pair being coupled to the first clock, each of a drain of the second parallel NMOS pair being coupled to at least one of the PMOS pair and the first parallel NMOS pair, and each of a gate of the second parallel NMOS pair being coupled to a differential decision feedback equalization (DFE) voltage through a through a decision feedback digital to analog converter (DAC) of the DFE system external to the data latch circuit;
 a cross-coupled PMOS pair to generate a positive feedback to at least one of the first parallel NMOS pair, the second parallel NMOS pair and another NMOS pair during a second stage of clocking the data latch circuit;
 a cross-coupled NMOS pair to escalate the positive feedback during a third stage of the clocking of the data latch circuit, each of a source of the cross-coupled NMOS pair being coupled to a third clock; and
 a latching circuit to generate a signal data based on the positive feedback, the latching circuit being an S-R latch, and an input of the latching circuit being coupled to at least one of the PMOS pair, the first parallel NMOS pair, the second parallel NMOS pair, the cross-coupled PMOS pair and the cross-coupled NMOS pair,
 wherein the first clock, the second clock, and the third clock are low during the first stage of clocking the data latch circuit,
 wherein the first clock and the second clock are high but the third clock is low during the second stage of clocking the data latch circuit, and wherein the first clock is low but the second clock and the third clock are high during the third stage of clocking the data latch circuit.

2. The data latch circuit of claim 1, wherein the signal data is an output data when the signal data is obtained through subtracting the DFE voltage from the differential input voltage.

3. The data latch circuit of claim 1, wherein the signal data is a negative error data when the signal data is obtained through subtracting the DFE voltage and a negative threshold voltage from the differential input voltage, and wherein the signal data is a positive error data when the signal data is obtained through subtracting the DFE voltage and a positive threshold voltage from the differential input voltage.

4. The data latch circuit of claim 1, wherein a first current induced by the differential input voltage and a second current induced by the DFE voltage are integrated during the second stage of clocking the data latch circuit.

5. The data latch circuit of claim 1, wherein the DFE voltage is obtained through applying an adaptive weight based on the signal data and error data to a previous data, wherein the previous data is the signal data generated through the latching circuit of the DFE system via feeding back the signal data to the first parallel NMOS pair through the decision feedback DAC of the DFE system, and wherein the decision feedback DAC of the DFE system is external to the data latch circuit of the DFE system.

6. The data latch circuit of claim 5, wherein, when the data latch circuit of the DFE system is coupled to at least one of a second data latch of the DFE system and a third data latch of the DFE system to generate at least one of an output signal and an error signal through the data latch circuit of the DFE system, the second data latch of the DFE system and the third data latch of the DFE system, an average power consumption of the DFE system is configured to reduce by 2 to 3 milliwatts per each of the data latch circuit of the DFE system, the second data latch of the DFE system, and the third data latch of the DFE system compared to a DFE system with an additional circuit configured to perform an application of the DFE voltage, a second DFE voltage associated with the second data latch, and a third DFE data associated with the third data latch.

7. The data latch circuit of claim 6, wherein, when the decision feedback DAC of the DFE system is shared between the data latch circuit of the DFE system, the second data latch of the DFE system and the third data latch of the DFE system, a power consumption of the DFE system is configured to decrease by at least 20 percent.

8. A method of a data latch circuit of a DFE system comprising:
inputting a differential input voltage through a first parallel NMOS pair of a two parallel NMOS pair of the data latch circuit;
inputting a DFE voltage through a second parallel NMOS pair of the two parallel NMOS pair of the data latch circuit;
reducing an average power consumption of the DFE system through performing at least one of a summing and a subtracting of the DFE voltage and the differential input voltage in the data latch circuit;
sampling in the data latch circuit a voltage resulting from summing the DFE voltage with the differential input voltage;
generating through a latching circuit of the data latch circuit a signal data based on a positive feedback from at least one of a cross-coupled NMOS pair and a cross-coupled PMOS pair;
pre-charging an input of the latching circuit to a chipset voltage when a parallel PMOS pair associated with a second clock of the data latch circuit is turned on in a first stage of clocking the data latch circuit;
generating the positive feedback to at least one of the first parallel NMOS pair, the second parallel NMOS pair and another NMOS pair through the cross-coupled PMOS pair of the data latch circuit in a second stage of clocking the data latch circuit; and
escalating the positive feedback through the cross-coupled NMOS pair to maximize a differential input voltage swing at the input of the latching circuit in a third stage of clocking the data latch circuit,
wherein each of a source of the parallel PMOS pair is coupled to a chipset voltage input,
wherein each of a gate of the parallel PMOS pair is coupled to a second clock to pre-charge each of a drain of the parallel PMOS pair to the chipset voltage during a first stage of clocking of the data latch circuit,
wherein each of a source of the first parallel NMOS pair is coupled to a first clock,
wherein each of a drain of the first parallel NMOS pair is coupled to the PMOS pair,
wherein each of a gate of the first parallel NMOS pair is coupled to the differential input voltage,
wherein each of a source of the second parallel NMOS pair is coupled to the first clock,
wherein each of a drain of the second parallel NMOS pair is coupled to at least one of the PMOS pair and the first parallel NMOS pair,
wherein each of a gate of the second parallel NMOS pair is coupled to the DFE voltage,
wherein each of a source of the cross-coupled NMOS pair is coupled to a third clock,
wherein the latching circuit is an S-R latch,
wherein the input of the latching circuit is coupled to at least one of the PMOS pair, the first parallel NMOS pair, the second parallel NMOS pair, the cross-coupled PMOS pair and the cross-coupled NMOS pair,
wherein the first clock, the second clock, and the third clock are low during the first stage of clocking the data latch circuit,
wherein the first clock and the second clock are high but the third clock is low during the second stage of clocking the data latch circuit, and
wherein the first clock is low but the second clock and the third clock are high during the third stage of clocking the data latch circuit.

9. The method of claim 8, wherein the signal data is an output of the data latch circuit when the signal data is obtained through subtracting the DFE voltage from the differential input voltage.

10. The method of claim 8, further comprising:
stopping the pre-charging of the input of the latching circuit of the data latch circuit in the second stage of clocking the data latch circuit; and
starting a sinking of current through at least one of the first parallel NMOS pair based on the differential input voltage and the second parallel NMOS pair based on the DFE voltage in the second stage of clocking the data latch circuit.

11. The method of claim 10, further comprising:
integrating a first current induced by the differential input voltage and a second current induced by the DFE voltage in the second stage of clocking the data latch circuit.

12. The method claim 8, further comprising:
reducing the average power consumption by 2 to 3 milliwatts when at least one of the summing and the subtracting is performed within the data latch circuit compared to performing at least one of the summing and the subtracting outside the data latch circuit through an additional circuit.

13. The method of claim 12, further comprising:
reducing, when the data latch circuit of the DFE system is coupled to at least one of a second data latch of the DFE system and a third data latch of the DFE system to generate at least one of an output signal and an error signal through the data latch circuit of the DFE system, the second data latch of the DFE system and a third data latch of the DFE system, the average power consumption of the DFE system by 2 to 3 milliwatts per each of the data latch circuit of the DFE system, the second data latch of the DFE system, and the third data latch of the DFE system compared to a DFE system with the additional circuit to perform application of the DFE voltage, a second DFE voltage associated with the second data latch, and a third DFE data associated with the third data latch.

14. The method of claim 8,
wherein the first parallel NMOS pair, the second parallel NMOS pair, the cross-coupled NMOS pair, the cross-coupled PMOS pair and the latching circuit are coupled to each other.

15. The method of claim 8,
wherein the signal data is a negative error data when the signal data is obtained through subtracting the DFE voltage and a negative threshold voltage from the differential input voltage, and
wherein the signal data is a positive error data when the signal data is obtained through subtracting the DFE voltage and a positive threshold voltage from the differential input voltage.

16. The method of claim 8, further comprising:
applying an adaptive weight external to the data latch circuit based on the signal data and error data to a previous data to obtain the DFE voltage,
generating the previous data through feeding back the signal data to the first parallel NMOS pair through a decision feedback DAC of the DFE system, the signal data being generated through the latching circuit of the DFE system, and
decreasing a power consumption of the DFE system by at least 20 percent, when the decision feedback DAC of the DFE system is shared between multiple data latch circuits of the DFE system when the DFE system comprises the multiple data latch circuits.

17. A data latch circuit of a DFE system, comprising:
a first parallel NMOS pair of a two parallel NMOS pair to input a differential input voltage, each of a source of the first parallel NMOS pair being coupled to a first clock;
a second parallel NMOS pair of the two parallel NMOS pair coupled to the first parallel NMOS pair to input a DFE voltage, each of a source of the second parallel NMOS pair being coupled to the first clock;
a cross-coupled PMOS pair to generate a positive feedback to at least one of the first parallel NMOS pair, the second parallel NMOS pair and another NMOS pair during a second stage of clocking the data latch circuit;
a cross-coupled NMOS pair to escalate the positive feedback during a third stage of the clocking of the data latch circuit, each of a source of the cross-coupled NMOS pair being coupled to a third clock;
a threshold decision feedback DAC to generate at least one of a negative threshold voltage, a common mode threshold voltage and a positive threshold voltage; and
a latching circuit to generate a signal data based on at least one of sinking of a current at an input of the latching circuit in the second stage of clocking of the data latch circuit and the positive feedback,
wherein the latching circuit is an S-R latch,
wherein the input of the latching circuit is coupled to at least one the first parallel NMOS pair, the second parallel NMOS pair, the cross-coupled PMOS pair and the cross-coupled NMOS pair,
wherein each of a drain of the first parallel NMOS pair is coupled to the PMOS pair,
wherein each of a gate of the first parallel NMOS pair is coupled to the differential input voltage,
wherein each of a drain of the second parallel NMOS pair is coupled to at least one of the PMOS pair and the first parallel NMOS pair,
wherein each of a gate of the second parallel NMOS pair is coupled to the DFE voltage,
wherein the first clock, a second clock, and the third clock are low during a first stage of clocking the data latch circuit,
wherein the first clock and the second clock are high but the third clock is low during the second stage of clocking the data latch circuit, and
wherein the first clock is low but the second clock and the third clock are high during the third stage of clocking the data latch circuit.

18. The data latch circuit of claim 17, further comprising:
a parallel PMOS pair, an each of a source of the parallel PMOS pair being coupled to a chipset voltage, and each of a gate of the parallel PMOS pair being coupled to the second clock to pre-charge each of a drain of the parallel PMOS pair to the chipset voltage during the first stage of clocking of the data latch circuit.

19. The data latch circuit of claim 17, further comprising:
an adaptor circuit external to the data latch circuit to generate at least one of the negative threshold voltage, the common mode threshold voltage and the positive threshold voltage through adjusting an adaptive weight applied to a previous data based on the signal data, the adaptor circuit being coupled to the threshold decision feedback DAC.

20. The data latch circuit of claim 17,
wherein the signal data is an output data when the signal data is obtained through subtracting the DFE voltage from the differential input voltage,
wherein the signal data is a negative error data when the signal data is obtained through subtracting the DFE voltage and the negative threshold voltage from the differential input voltage,
wherein the signal data is a positive error data when the signal data is obtained through subtracting the DFE voltage and the positive threshold voltage from the differential input voltage, and
wherein at least one of a summing and a subtracting is performed in the data latch circuit.

21. The data latch circuit of claim 20,
wherein an average power consumption of the data latch circuit is configured to reduce by 2 to 3 milliwatts when at least one of the summing and the subtracting is performed within the data latch circuit compared to performing the at least one of the summing and the subtracting outside the data latch circuit through additional circuits, and wherein, when the data latch circuit of the DFE system is coupled to at least one of a second data latch of the DFE system and a third data latch of the DFE system to generate at least one of an output signal and an error signal through the data latch circuit of the DFE system, the second data latch of the DFE system and the third data latch of the DFE system, the average power consumption of the DFE system is configured to reduce by 2 to 3 milliwatts per each of the data latch circuit of the DFE system, the second data latch of the DFE system, and the third data latch of the DFE system compared to a DFE system with the additional circuits to perform application of the DFE voltage, a second DFE voltage associated with the second data latch, and a third DFE data associated with the third data latch.

22. The data latch circuit of claim 17, wherein a power consumption of the DFE system is configured to reduce by at least 20 percent when the decision feedback DAC of the DFE system is shared between a plurality of data latch circuits of the DFE system, with the DFE system comprising the plurality of data latch circuits.

23. A data latch circuit of a DFE system, comprising:
a first parallel NMOS pair of a two parallel NMOS pair of the data latch circuit to input a differential input voltage, each of a source of the first parallel NMOS pair being coupled to a first clock;
a second parallel NMOS pair of the two parallel NMOS pair of the data latch circuit coupled to the first parallel NMOS pair to input a DFE voltage, each of a source of the second parallel NMOS pair being coupled to the first clock;
a cross-coupled PMOS pair to generate a positive feedback to at least one of the first parallel NMOS pair, the second parallel NMOS pair and another NMOS pair during a second stage of clocking the data latch circuit;
a cross-coupled NMOS pair to escalate the positive feedback during a third stage of the clocking of the data latch circuit, each of a source of the cross-coupled NMOS pair being coupled to a third clock; and
a latching circuit to generate a signal data based on at least one of sinking of a current at an input of the latching circuit in the second stage of clocking of the data latch circuit and the positive feedback,
wherein the latching circuit is an S-R latch,
wherein the input of the latching circuit is coupled to at least one the first parallel NMOS pair, the second parallel NMOS pair, the cross-coupled PMOS pair and the cross-coupled NMOS pair,
wherein each of a drain of the first parallel NMOS pair is coupled to the PMOS pair,
wherein each of a gate of the first parallel NMOS pair is coupled to the differential input voltage,
wherein each of a drain of the second parallel NMOS pair is coupled to at least one of the PMOS pair and the first parallel NMOS pair,
wherein each of a gate of a second parallel NMOS pair is coupled to the DFE voltage,
wherein the first clock, a second clock, and the third clock are low during a first stage of clocking the data latch circuit,
wherein the first clock and the second clock are high but the third clock is low during the second stage of clocking the data latch circuit, and
wherein the first clock is low but the second clock and the third clock are high during the third stage of clocking the data latch circuit.

24. The data latch circuit of claim 23, further comprising:
a parallel PMOS pair, each of a source of the parallel PMOS pair being coupled to a chipset voltage, and each of a gate of the parallel PMOS pair being coupled to the second clock to pre-charge each of a drain of the parallel PMOS pair to the chipset voltage during the first stage of clocking of the data latch circuit,
wherein the DFE voltage is generated through a decision feedback DAC of the DFE system external to the data latch circuit.

25. The data latch circuit of claim 24,
wherein an average power consumption of the data latch circuit is configured to reduce by 2 to 3 milliwatts when at least one of a summing and a subtracting is performed within the data latch circuit compared to performing the at least one of the summing and the subtracting outside the data latch circuit through additional circuits.

26. The data latch circuit of claim 25,
wherein, when the data latch circuit of the DFE system is coupled to at least one of a second data latch of the DFE system and a third data latch of the DFE system to generate at least one of an output signal and an error signal through the data latch circuit of the DFE system, the second data latch of the DFE system and the third data latch of the DFE system, the average power consumption of the DFE system is configured to reduce by 2 to 3 milliwatts per each of the data latch circuit of the DFE system, the second data latch of the DFE system, and the third data latch of the DFE system compared to a DFE system with the additional circuits to perform application of the DFE voltage, a second DFE voltage associated with the second data latch, and a third DFE data associated with the third data latch, and
wherein a power consumption of the DFE system is configured to reduce by at least 20 percent when the decision feedback DAC of the DFE system is shared between a plurality of data latch circuits of the DFE system, with the DFE system comprising the plurality of data latch circuits.

* * * * *